(12) United States Patent
Langston et al.

(10) Patent No.: US 6,684,623 B2
(45) Date of Patent: Feb. 3, 2004

(54) GEARLESS ELECTRIC THRUST REVERSER ACTUATORS AND ACTUATION SYSTEM INCORPORATING SAME

(75) Inventors: Todd A. Langston, Chandler, AZ (US); Andrew T. Johnson, Scottsdale, AZ (US); Terry J. Ahrendt, Mesa, AZ (US)

(73) Assignee: Honeywell International, Inc., Morristown, NJ (US)

( * ) Notice: Subject to any disclaimer, the term of this patent is extended or adjusted under 35 U.S.C. 154(b) by 121 days.

(21) Appl. No.: 10/083,854

(22) Filed: Feb. 27, 2002

(65) Prior Publication Data
US 2003/0159429 A1 Aug. 28, 2003

(51) Int. Cl.⁷ ............................ F02K 3/02; B05B 12/00
(52) U.S. Cl. .................. 60/226.2; 60/230; 244/110 B; 239/265.29
(58) Field of Search ............... 60/226.2, 230; 244/110 B; 239/265.29

(56) References Cited

U.S. PATENT DOCUMENTS

| 1,175,346 A | 3/1916 | Dearborn |
| 2,912,632 A | 11/1959 | Turtil |
| 3,514,952 A | 6/1970 | Schumacher et al. |
| 3,515,361 A | 6/1970 | Blackburn |
| 3,618,880 A | 11/1971 | Hagaman et al. |
| 3,621,763 A | 11/1971 | Geyer |
| 3,714,535 A | 1/1973 | Krivak et al. |
| 3,795,853 A | 3/1974 | Whitehouse |
| 3,815,357 A | 6/1974 | Brennan |
| 3,932,058 A | 1/1976 | Harner et al. |
| 3,936,226 A | 2/1976 | Harner et al. |
| 4,005,822 A | 2/1977 | Timms |
| 4,137,711 A | 2/1979 | Montgomery |
| 4,184,107 A | 1/1980 | Turnini et al. |
| 4,191,094 A | 3/1980 | Flippo |
| 4,232,516 A * | 11/1980 | Lewis et al. ............... 60/226.2 |
| 4,284,930 A | 8/1981 | Matty |
| 4,297,844 A | 11/1981 | Halin et al. |
| 4,383,647 A | 5/1983 | Woodruff et al. |
| 4,424,669 A | 1/1984 | Fage |
| 4,437,783 A | 3/1984 | Halin et al. |
| 4,442,928 A | 4/1984 | Eastman |
| 4,458,863 A | 7/1984 | Smith |
| 4,459,121 A | 7/1984 | Gazzera et al. |
| 4,462,207 A * | 7/1984 | Hitchcock ................... 60/204 |
| 4,519,561 A * | 5/1985 | Timms ................... 244/110 B |
| 4,543,783 A | 10/1985 | Greiine et al. |
| 4,546,783 A | 10/1985 | Lott |
| 4,585,189 A | 4/1986 | Buxton |
| 4,586,329 A | 5/1986 | Carlin |
| 4,607,202 A | 8/1986 | Koenig |
| 4,651,621 A | 3/1987 | Eastman |
| 4,656,407 A | 4/1987 | Burney |
| 4,788,531 A | 11/1988 | Corwin et al. |
| 4,827,248 A | 5/1989 | Crudden et al. |
| 5,167,119 A | 12/1992 | Ward |
| 5,213,286 A | 5/1993 | Elliott et al. |
| 5,243,817 A | 9/1993 | Matthias |
| 5,267,436 A | 12/1993 | Wood, Jr. et al. |
| 5,282,719 A | 2/1994 | McCarty et al. |
| 5,313,788 A | 5/1994 | Wright et al. |
| 5,327,055 A | 7/1994 | Danielson et al. |

(List continued on next page.)

FOREIGN PATENT DOCUMENTS

| EP | 1 052 427 | 11/2000 |
| WO | PCT/US 03/05589 | 7/2003 |

*Primary Examiner*—Charles G. Freay
(74) *Attorney, Agent, or Firm*—Robert Desmond, Esq.

(57) ABSTRACT

A gearless electric thrust reverser actuator includes an electric motor that is coupled to a jack screw without any intervening gears. The actuator may additionally include all of the actuation and sensing components in a single actuation package. Thus, the actuator is relatively lightweight and compact.

35 Claims, 7 Drawing Sheets

U.S. PATENT DOCUMENTS

| | | |
|---|---|---|
| 5,381,654 A | 1/1995 | Halin |
| 5,448,884 A | 9/1995 | Repp |
| 5,524,431 A | 6/1996 | Brusson et al. |
| 5,615,549 A | 4/1997 | Valleroy |
| 5,813,218 A | 9/1998 | Kohlbacher |
| 5,826,823 A | 10/1998 | Lymons et al. |
| 5,904,041 A | 5/1999 | Dhainault |
| 5,960,626 A | 10/1999 | Baudu et al. |
| 5,996,937 A | 12/1999 | Gonidec et al. |
| 6,009,356 A | 12/1999 | Monroe |
| 6,021,636 A | 2/2000 | Johnson et al. |
| 6,034,492 A | 3/2000 | Saito et al. |
| 6,042,053 A | 3/2000 | Sternberger et al. |
| 6,044,641 A | 4/2000 | Baudu et al. |
| 6,094,908 A | 8/2000 | Baudu et al. |
| 6,121,740 A | 9/2000 | Gale et al. |
| 6,167,694 B1 | 1/2001 | Davies |
| 6,178,867 B1 | 1/2001 | Kovac |
| 6,211,665 B1 | 4/2001 | Ahrendt et al. |
| 6,240,246 B1 | 5/2001 | Evans |
| 6,307,339 B1 | 10/2001 | Yourist et al. |

* cited by examiner ns. Pneumatic systems include one or more controllers coupled to one or more pneumatic motors that are coupled to the thrust reverser moveable components via actuators.
GEARLESS ELECTRIC THRUST REVERSER ACTUATORS AND ACTUATION SYSTEM INCORPORATING SAME

BACKGROUND OF THE INVENTION

The present invention relates to a thrust reverser actuator and, more particularly to a gearless electric thrust reverser actuator and a thrust reverser actuator system that incorporates the actuator.

When jet-powered aircraft land, the landing gear brakes and imposed aerodynamic drag loads (e.g., flaps, spoilers, etc.) of the aircraft may not be sufficient to slow the aircraft down in the required amount of runway distance. Thus, jet engines on most aircraft include thrust reversers to enhance the stopping power of the aircraft. When deployed, thrust reversers redirect the rearward thrust of the jet engine to a forward direction to decelerate the aircraft. Because the jet thrust is directed forward, the jet thrust also slows down the aircraft upon landing.

Various thrust reverser designs are commonly known, and the particular design utilized depends, at least in part, on the engine manufacturer, the engine configuration, and the propulsion technology being used. Thrust reverser designs used most prominently with turbofan jet engines fall into three general categories: (1) cascade-type thrust reversers; (2) target-type thrust reversers; and (3) pivot door thrust reversers. Each of these designs employs a different type of moveable thrust reverser component to change the direction of the jet thrust.

Cascade-type thrust reversers are normally used on high-bypass ratio jet engines. This type of thrust reverser is located on the circumference of the engine's midsection and, when deployed, exposes and redirects air flow through a plurality of cascade vanes. The moveable thrust reverser components in the cascade design includes several translating sleeves or cowls ("transcowls") that are deployed to expose the cascade vanes.

Target-type reversers, also referred to as clamshell reversers, are typically used with low-bypass ratio jet engines. Target-type thrust reversers use two doors as the moveable thrust reverser components to block the entire jet thrust coming from the rear of the engine. These doors are mounted on the aft portion of the engine and may form the rear part of the engine nacelle.

Pivot door thrust reversers may utilize four doors on the engine nacelle as the moveable thrust reverser components. In the deployed position, these doors extend outwardly from the nacelle to redirect the jet thrust.

The primary use of thrust reversers, as noted above, is to enhance the stopping power of the aircraft, thereby shortening the stopping distance during landing. Hence, thrust reversers are primarily deployed during the landing process to slow the aircraft. Thereafter, when the thrust reversers are no longer needed, they are returned to their original, or stowed, position.

The movement of the moveable thrust reverser components in each of the above-described designs has, in the past, been accomplished via hydraulic or pneumatic actuation systems. Hydraulic systems may include hydraulic controllers and lines coupled to the aircraft's hydraulic system, hydraulic actuators connected to the moveable components, and electrically or hydraulically controlled locking mechanisms. Pneumatic systems include one or more controllers coupled to one or more pneumatic motors that are coupled to the thrust reverser moveable components via actuators.

More recently, however, thrust reverser actuation is being controlled by electric (or electromechanical) systems. These systems include one or more electronic controller units that control the operation of one or more electric motors. The electric motors are coupled to one or more thrust reverser actuators via reduction gears, which allow the motors to operate more efficiently at high rotational speeds. In some instances, the motors may be coupled to the actuators, without intervening reduction gears, via compound lead-screws.

The size and weight of current electric thrust reverser actuation systems, while suitable for large commercial jet aircraft applications, may not scale-down well for smaller jet aircraft applications, such as business jet aircraft. For example, the reduction gears between the electric motors and actuators may have an increased system size and weight, as compared to conventional small jet systems. This is partly because the actuation and sensing components associated with the system are individual, non-integral devices which are of a certain weight and space envelope. Thus, a smaller electric actuation system may be heavier and larger than a conventional non-electric actuation system. Thus, such a conventional electric actuation system may be impractical or inefficient because of its size and weight.

Hence, there is a need for an electric thrust reverser actuation system scaleable to small aircraft applications that includes electric actuators that are lightweight and compact, and that may include the actuation and sensing components in a single actuation package. The present invention addresses one or more of these needs.

SUMMARY OF THE INVENTION

The present invention provides an electric thrust reverser actuation system that includes electric actuators that are lightweight, and/or compact, and/or include the actuation and sensing components in a single actuation package. The actuators may, therefore, be utilized in relatively small jet aircraft applications.

In one embodiment of the present invention, and by way of example only, a system for controlling the movement of a jet engine thrust reverser includes a controller and at least two moveable actuators. The controller is coupled to receive command signals and is operable, in response thereto, to selectively supply actuator control signals. Each of the moveable actuators is operable to move the thrust reverser between a stowed position and a deployed position, and each has an electric motor, a rotationally mounted jack screw, and a roller nut. The electric motor has an output shaft, and is coupled to receive the actuator control signals from the controller and, in response thereto, to rotate the output shaft in one of a stow direction and a deploy direction. The jack screw has a first end directly coupled to the electric motor output shaft to thereby rotate in the stow direction and deploy direction. The roller nut is mounted on the jack screw and is coupled to one of the thrust reversers. Rotation of the jack screw in the stow direction causes translation of the roller nut and its associated thrust reverser toward the stowed position and rotation of the jack screw in the deploy direction causes translation of the ballnut and its associated thrust reverser toward the deployed position.

In another aspect of the present invention, an actuator including an electric motor, a rotationally mounted jack screw, and a roller nut. The electric motor has an output shaft operable to rotate in one of a first direction and a second direction. The jack screw has a first end directly coupled to the electric motor output shaft to thereby rotate in the first direction and second direction. The roller nut is mounted on the jack screw. Rotation of the jack screw in the first direction causes translation of the ball toward the first end and rotation of the jack screw in the second direction causes translation of the ballnut toward the second position.

In still another aspect of the present invention, an actuator with one or more integral locks is provided. Each of the locks is adapted to be pivotally mounted on the actuator and operable to selectively move between a locked position and an unlocked position and includes a first protrusion, a second protrusion, a third protrusion, a biasing element, and a solenoid. The first protrusion is adapted to engage a thrust reverser to thereby rotate the lock from the unlocked position to the locked position when the actuator moves from a first position to a second position. The second protrusion is adapted to engage the thrust reverser when the actuator moves from the second position to the first position. The third protrusion is adapted to cooperate with a position sensor to provide an indication of the position of the lock. The biasing element is mounted proximate to, and in abutting contact with, the second protrusion to thereby bias the lock toward the unlocked position. The solenoid has a moveable slug and is operable, in response to a lock control signal, to selectively move the slug so as to engage and disengage the lock.

Other independent features and advantages of the preferred actuator and actuation system will become apparent from the following detailed description, taken in conjunction with the accompanying drawings which illustrate, by way of example, the principles of the invention.

DETAILED DESCRIPTION OF THE PREFERRED EMBODIMENT

Before proceeding with the detailed description of the a device embodying the invention, it is to be appreciated that the described embodiment is not limited to use in conjunction with a specific type of thrust reverser design. Thus, although the described embodiment is, for convenience of explanation, depicted and described as being implemented with a target-type thrust reverser, in which two pivotally mounted doors are used as the moveable thrust reverser components, it can be implemented with other types of thrust reverser designs.

Figure 1:
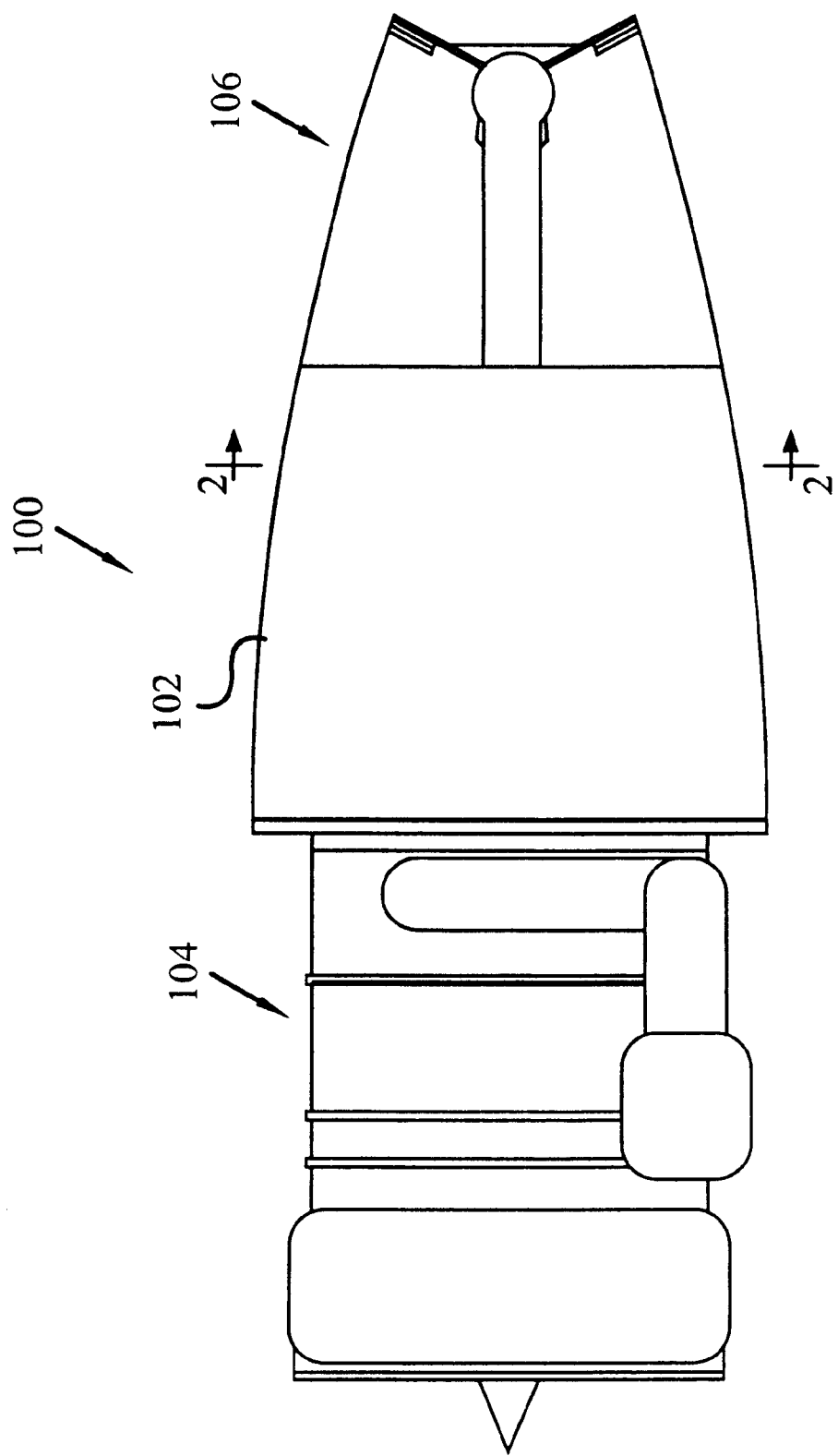
FIG. 1 is a side view of a jet engine with a portion of its housing removed that may utilize the gearless thrust reverser retractor of the present invention.

Turning now to the description, and with reference first to FIG. 1, a simplified side view of a jet engine assembly is depicted. Such an engine is also known as a gas turbine engine. The engine assembly 100 includes an engine nacelle 102 that houses a jet engine 104. The skilled artisan will appreciate that, for convenience, the entire jet engine 104 is not depicted in FIG. 1, rather only that portion of the engine 104 that protrudes from the engine nacelle 102 is depicted. This depicted portion is the jet engine exhaust, near which the thrust reverser and the actuators are mounted.

Figure 2:
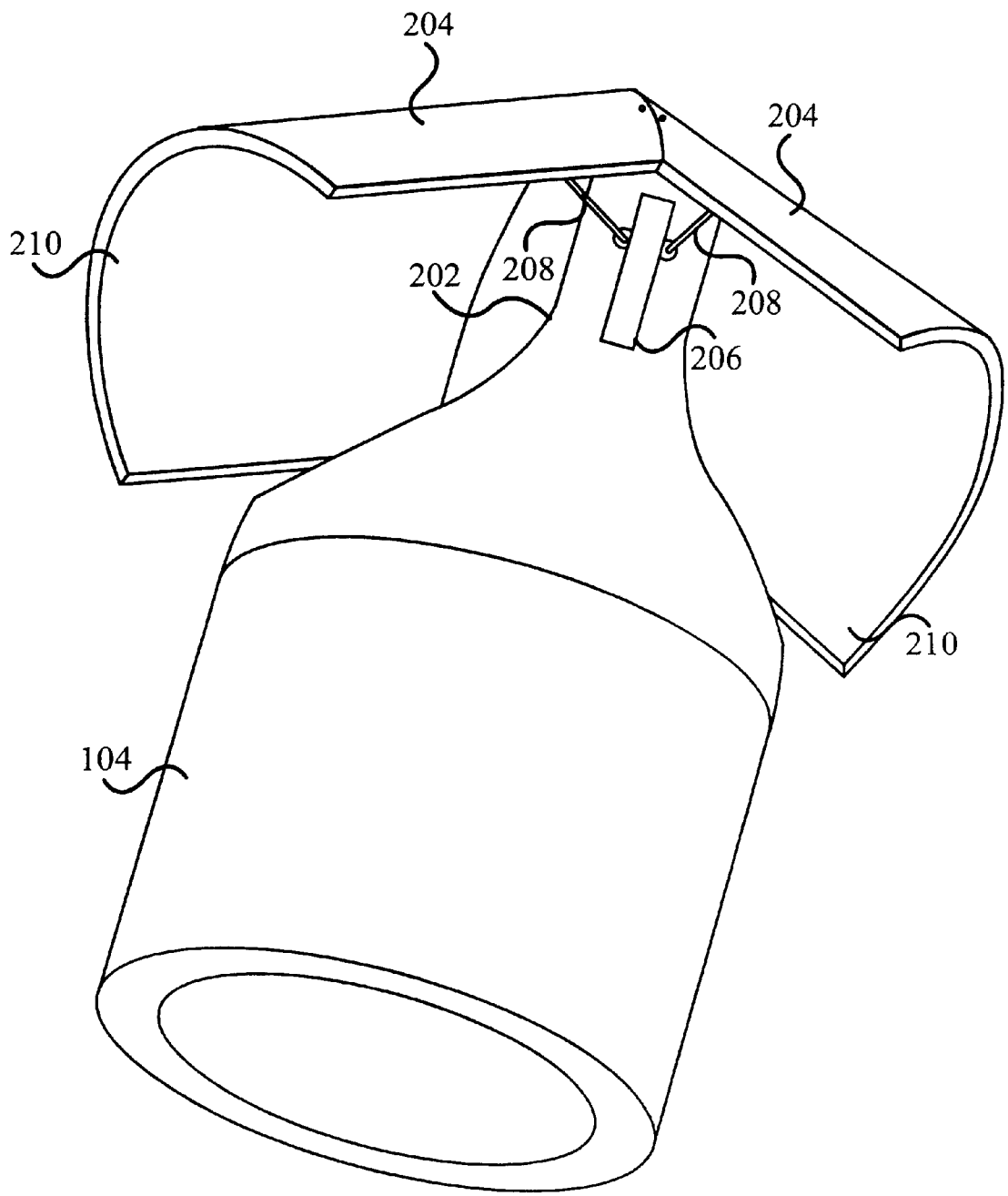
FIG. 2 is a simplified perspective cut away view of the exhaust portion of a jet engine taken along line 2—2 of FIG. 1, which depicts an exemplary embodiment of the gearless electric actuators of the present invention and the target-type thrust reverser in its deployed position.

Turning now to FIG. 2, which provides a perspective cut away view of the exhaust portion of the jet engine 104, taken along line 2—2 of FIG. 1, with the thrust reverser deployed, the actuators of the present invention will be discussed. As FIG. 2 depicts, the exhaust portion of the jet engine 104 includes two rearwardly extending arms 202 (only one of which is illustrated). Two deflector doors 204 function as the jet engine thrust reverser, and are pivotally mounted to each of the arms 202. The doors 204 are substantially flush with, and form part of, the jet engine exhaust portion 104 when the thrust reverser is in the stowed position, as depicted in FIG. 1. When the thrust reverser is deployed, as FIG. 2 depicts, the doors 204 are pivoted outwardly and redirect the jet engine exhaust. Thus, the jet engine exhaust is deflected forward to produce reverse thrust to slow the aircraft upon landing.

A gearless electric actuator 206 is mounted to each one of the extension arms 202. Each of actuators 206, which are discussed in more detail below, is coupled to the two doors 204 by two links 208. One end of each of the links 208 is pivotally affixed to an inner portion 210 of each door 204, and the other end of each link 208 is connected to one of the actuators 206. This connection and the operation of the actuators 206 will become more apparent from the below detailed description of an exemplary embodiment of the actuators 206.

Figure 3:
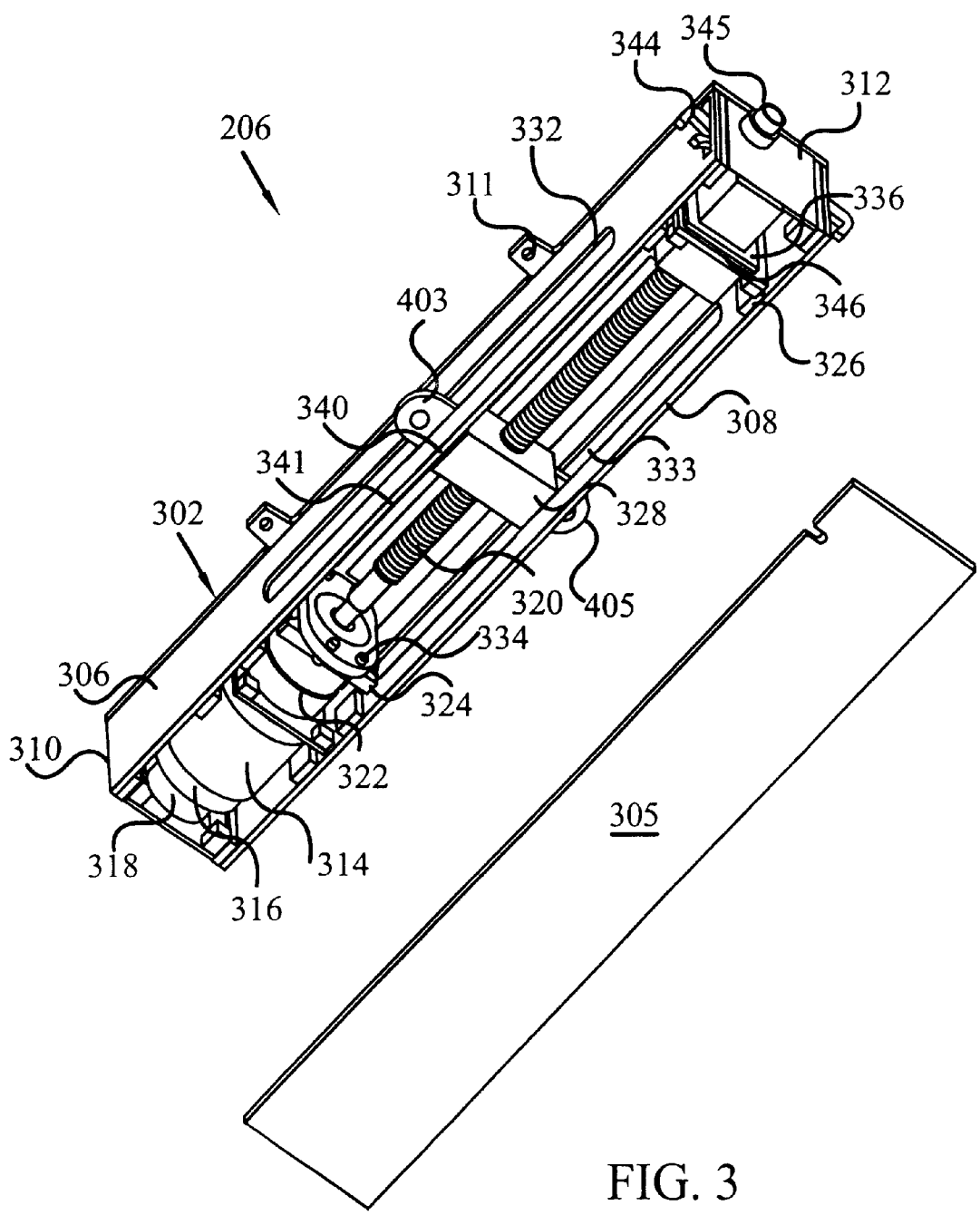
FIG. 3 is a perspective view of an exemplary gearless electric actuator according to an embodiment of the present invention.
Figure 4:
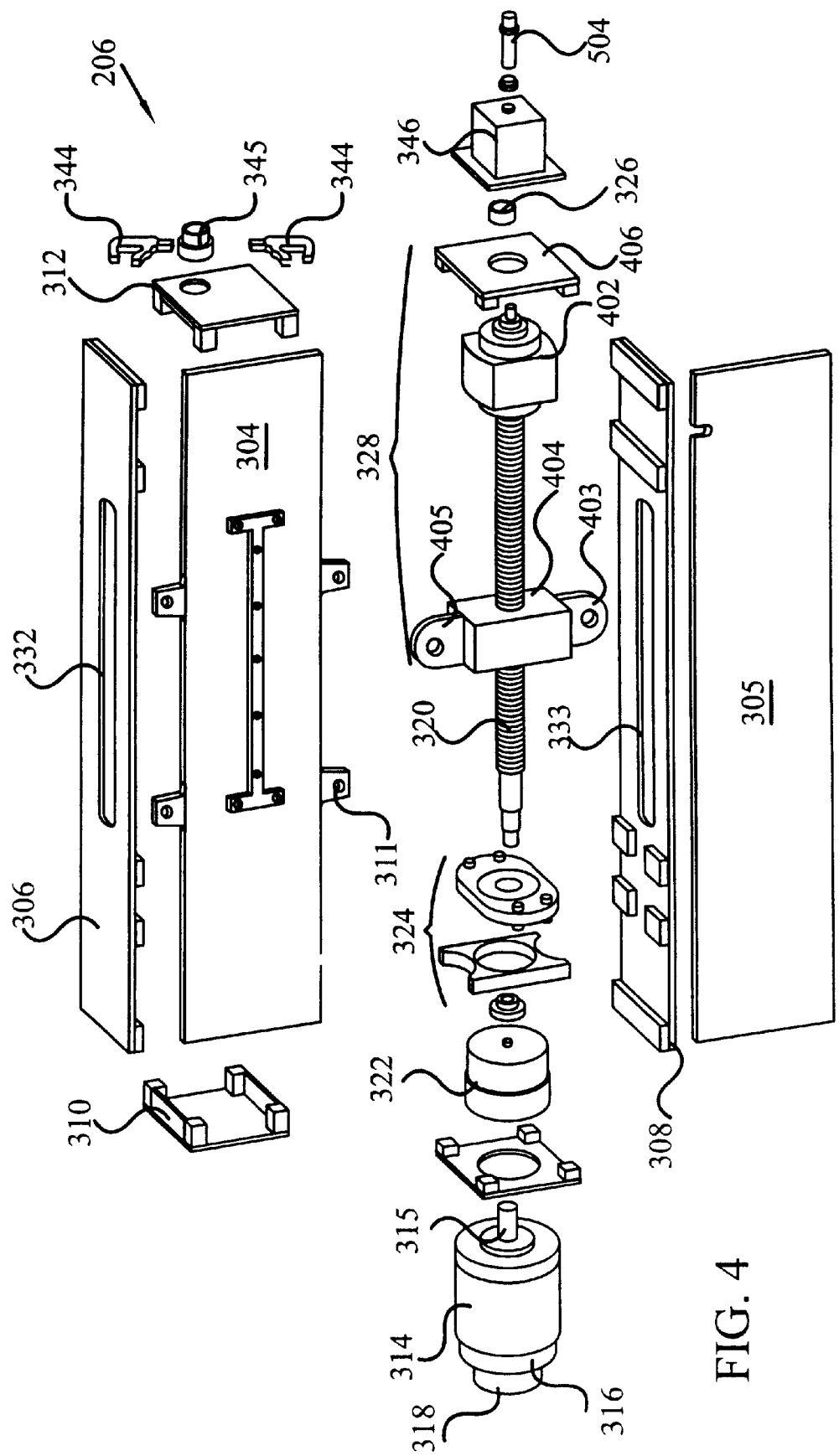
FIG. 4 is a perspective exploded view of the exemplary gearless electric actuator depicted in FIG. 3.

Turning now to FIGS. 3 and 4, a detailed description of the actuator 206 is shown. In the depicted embodiment, the actuator 206 includes a housing 302, which is used to couple the actuator 206 to the jet engine exhaust portion. The housing 302 includes a first side plate 304, a top plate 306, a bottom plate 308, a first end plate 310, a second end plate 312, and a second side plate 305 (see FIG. 4). The first side plate 304 includes mounting tabs 311 that are used to mount the actuator 206 to the extension arms 202. It will be appreciated that the actuator 206 could be installed into the jet engine 104 without being enclosed within the housing 302. It is noted that the second side plate 305 of the housing 302 is not illustrated in FIG. 3 so that each of the various components that make up the actuator 206, and which are mounted within the housing 302, may be more fully depicted in their installed configurations. Each of these various components will now be described in more detail.

Inside the actuators 206, an electric motor 314 is mounted to the housing 302 near the first end plate 310, and includes an output shaft 315 (depicted in FIG. 4). The electric motor 314 may be any one of numerous known alternating current (AC) or direct current (DC) motor designs. However, in a preferred embodiment the motor 314 is a brush DC motor. An electromagnetic brake assembly 316 is also mounted near the first end plate 310 of the housing 302 and is coupled to the electric motor 314. The electromagnetic brake assembly 316 may be any one of numerous electromagnetic brake designs known in the art that, preferably, applies a braking force to the motor 314 when power is removed from the brake assembly 316, and removes the braking force when power is supplied to it. A speed sensor 318 may additionally be coupled to any one of the actuator's rotating elements including, but not limited to, the motor 314, the electromagnetic brake assembly 316, and the jack screw 320 (described below). The speed sensor 318 is used to sense rotational speed and provide a speed control feedback signal. In particular, as is generally known, various speed control schemes may be utilized to control the speed of a motor. Some control schemes use feedback from a speed sensor while others (so-called sensorless speed control schemes) do not require speed sensor feedback. Both types of control schemes are known in the art and, therefore, need not be further described. However, if the actuator 206, and thus the motor 314, is controlled using a speed sensor feedback control scheme, then the speed sensor 318 is preferably included. If, however, the motor 314 is controlled using a sensorless speed control scheme, then the speed sensor may not be included. The speed sensor 318 may be any one of numerous speed sensors known in the art including, but not limited to, a tachometer and an optic sensor.

The electric motor output shaft 315 is coupled to a jack screw 320, without any intervening gearing. In addition, as in the depicted embodiment, the electric motor output shaft 315 may be coupled to the jack screw 320 via a flexible coupling 322. Alternatively, the electric motor output shaft 315 may be coupled to the jack screw 320 via a splined coupling. In a preferred embodiment, however, the electric motor output shaft 315 is coupled directly to the jack screw 320. Nonetheless, in each case the jack screw 320 is directly rotated by the motor output shaft 315, without the aid of any intervening gears. The jack screw 320 is rotationally mounted using a pair of bearing assemblies, a first bearing assembly 324 and a second bearing assembly 326, that are mounted within the housing 302 at opposite ends of the jack screw 320. The jack screw is manufactured with relatively fine pitched threads. For example, in one embodiment, the jack screw is a roller screw manufactured with a thread pitch of approximately 0.078 inches (2.0 millimeters). As is generally known, roller screws are one specific category of jack screws that are manufactured with such a fine thread pitch. A non-limiting example of one such roller screw that may be used with the present invention is manufactured by Ina Bearing Company, having a part number RGTFS 20.2.258. It will additionally be appreciated that as the pitch of the threads on the jack screw gets lower, the motor size and power can be lowered, and vice-versa. The specific thread pitch and motor size are selected to provide the proper system performance and fit within the desired size envelope of the actuator.

A roller nut assembly 328 is mounted on the jack screw 320 between the first 324 and second 326 bearing assemblies. As shown more particularly in FIG. 4, the roller nut assembly 328 includes a roller nut 402 that is enclosed within a housing assembly that, in the depicted embodiment, includes an adapter housing 404 and an end wall 406. The adapter housing 404 includes two connection links 403, 405 that allow the roller nut assembly 328 to be coupled to the thrust reverser doors 204. In the embodiment depicted in FIG. 3, one connection link 403 extends through a first translation slot 332 in the top plate 306, and the other connection link 405 extends through a second translation slot 333 in the bottom plate 308. The thrust reverser links 206 are connected, one each, to the connection links 403, 405. Thus, translation of the roller nut assembly 328 from proximate the second bearing assembly 326 to proximate the first assembly 324 causes the thrust reverser links 206 to move the doors 204 to the deployed position, and the reverse translation of the roller nut assembly 328, from proximate the first bearing assembly 324 to proximate the second bearing assembly 326, causes the thrust reverser links 206 to move the doors 204 to the stowed position. It will be appreciated that although the roller nut assembly 328 is depicted in FIG. 4 as being formed of separate parts, it may also be formed as a single, integral unit. It will be further appreciated that the roller nut assembly 328 may include more or less than two link connection portions.

A plurality of position sensors are mounted within the housing 320 to supply signals representative of thrust reverser position. Specifically, a first proximity sensor 334 and a second proximity sensor 336 are used to supply thrust reverser position signals. The first 334 and second 336 proximity sensors are preferably eddy current kill oscillator (ECKO) type sensors, though other types of sensors known in the art, including but not limited to, Hall effect sensors, optic sensors, resistive sensors, RVDTs, and LVDTs, could also be used, alone or in combination as required by a particular application.

A first actuator target 338 and a second actuator target 340 are each mounted to the roller nut 328, one on each side. The first actuator target 338 and second actuator target 340 are each configured and comprised of an appropriate material for the specific sensor technology. Thus, when the first actuator target 338 is proximate the first proximity sensor 334, the first proximity sensor 334 supplies an electrical output signal indicating that the roller nut 328, and thus the thrust reverser, has reached the fully deployed position. Similarly, when the second actuator target 340 is proximate the second proximity sensor 336, the second proximity sensor 336 supplies an electrical output signal indicating that the roller nut 328, and thus the thrust reverser, has reached the stowed position. It is noted that although the first 338 and second 340 target assemblies are depicted as including adjustment bolts 341, in a preferred embodiment the target assemblies 338, 340 are not adjustable, but fixedly mounted to the roller nut 328.

The gearless electric actuator 206 further includes a thrust reverser door proximity sensor 342, a plurality of locks 344, and a lock solenoid 346, each of which are mounted proximate the second end plate 312 of the housing 302. The thrust reverser door sensor 342, similar to the first 334 and second 336 proximity sensors, is preferably an ECKO type sensor. Thus, a non-illustrated target, similar to the first 338 and second 340 actuator targets, is mounted to at least one of the thrust reverser doors 204. The thrust reverser door sensor 342 functions to provide an electrical indication that is indicative of whether or not the thrust reverser doors 204 are stowed. Specifically, when the thrust reverser door 204 with the mounted target is moved proximate the thrust reverser door sensor 342, the thrust reverser door sensor 342 supplies an electrical output signal indicating that the thrust reverser is in the stowed position.

A connector 345 is mounted to the second end plate 312. The connector 345 provides the electrical interface between the actuator 206 and any external control equipment (discussed further below). All electrical wiring (which is not illustrated in FIGS. 3 and 4) to and from all of the electrical components within the actuator 206 is coupled to the connector 345.

Figure 5:
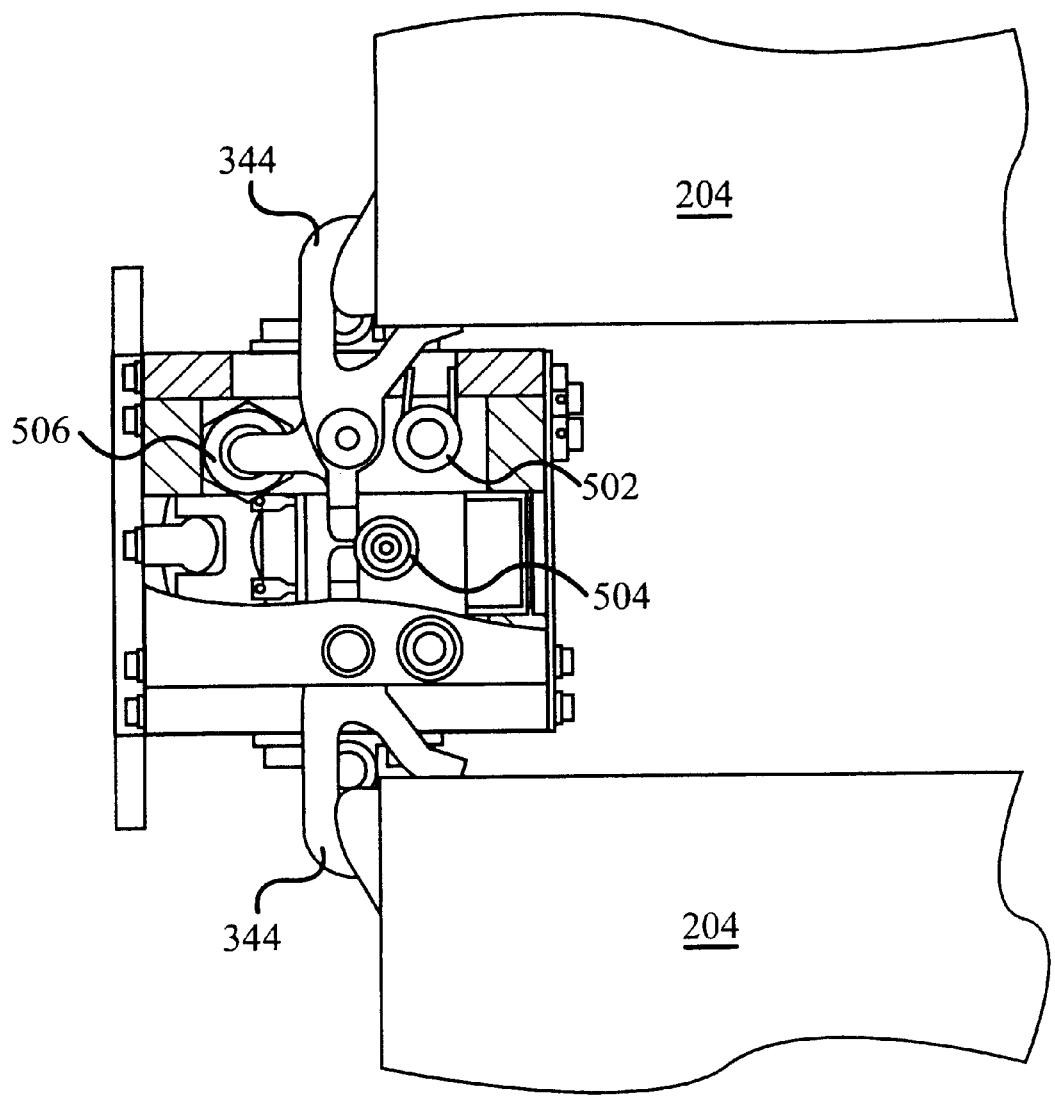
FIG. 5 is an end view of the exemplary gearless electric actuator depicted in FIG. 3, with an end portion of the housing removed and with the thrust reversers stowed and the actuator in a locked position.
Figure 6:
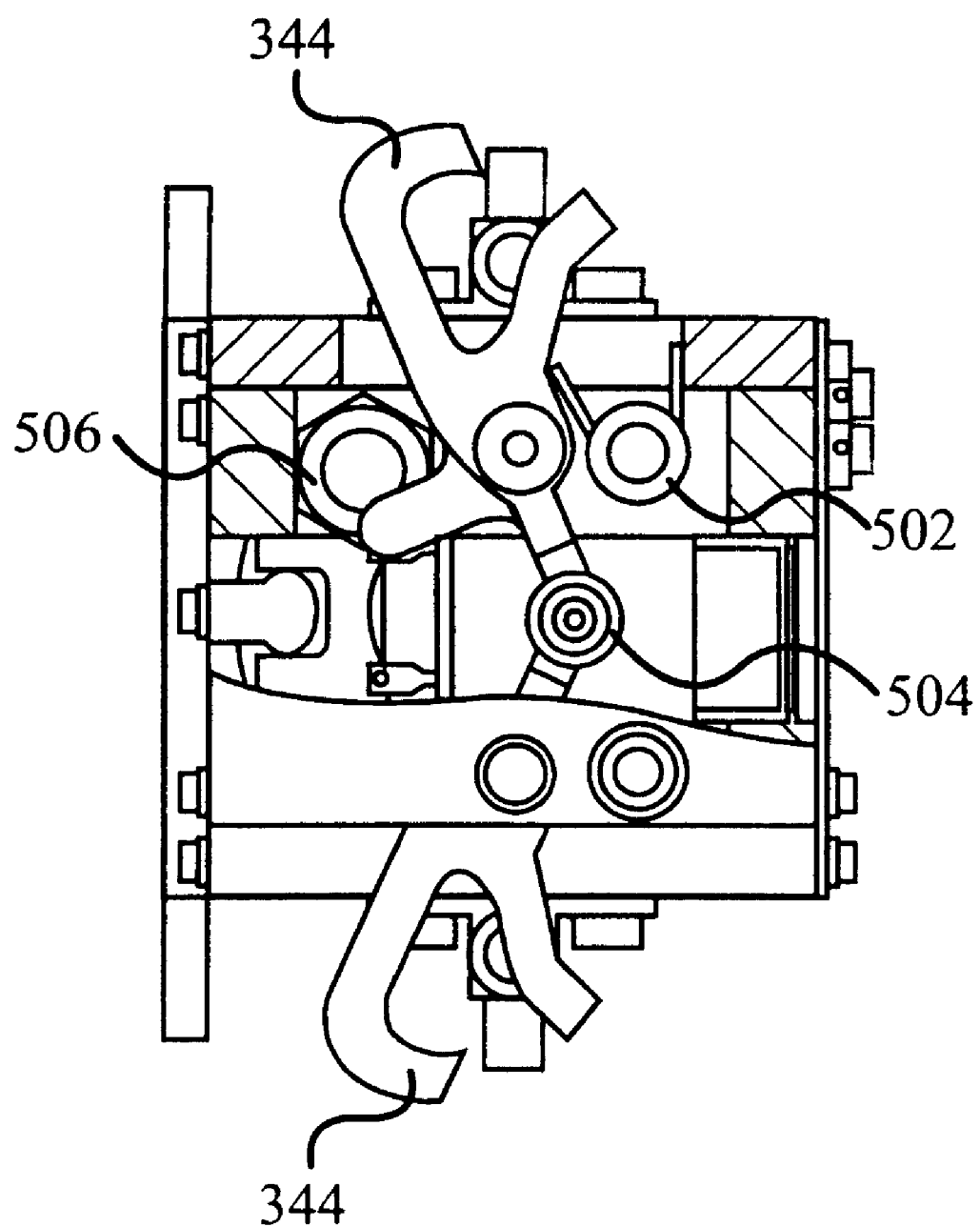
FIG. 6 is an end view of the exemplary gearless electric actuator depicted in FIG. 3, with an end portion of the housing removed and with the thrust reversers deployed and the actuator in an unlocked position.

Referring now to FIGS. 5 and 6 in conjunction with FIGS. 3 and 4, the structure and function of the locks 344 will now be described. When the thrust reverser doors 204 are in the stowed position, the locks 344 are moved to a locked position (see FIG. 5) to secure the thrust reverser doors 204 in the stowed position. Conversely, when the thrust reverser doors 204 are to be moved to the deployed position, the locks 344 are moved to an unlocked position (see FIG. 6) to allow the thrust reverser doors 204 to be moved.

The locks 344 are pivotally mounted within the housing 302 and are normally biased toward the unlocked position by a biasing element 502, such as the depicted spring, and are held in the locked position by the lock solenoid 346. In particular, the lock solenoid 346 includes a moveable slug 504 that extends from one of its ends. When the lock solenoid 346 is energized, the moveable slug 504 is retracted away from the locks 344. As a result, the biasing element 502 causes the locks 344 to pivot toward the unlocked position, thereby releasing the thrust reverser doors 204. Conversely, when the thrust reverser doors 204 are moved to the stowed position, the doors 204 move the locks 344 into the locked position against the biasing force of the biasing element 502. When the locks 344 reach the locked position, the lock solenoid 346 is de-energized. Because the moveable slug 504 is biased toward the extended position by a non-illustrated spring, when the lock solenoid 346 is de-energized the moveable slug 504 extends toward the locks 344 and holds the locks 344 in the locked position. A lock proximity sensor 506 is mounted within the housing 302 and supplies an electrical signal that indicates when the locks 344 have reached the locked position. The lock proximity sensor 506 is preferably the same type of device as that of the first 334 and second 336 proximity sensors, and the thrust reverser door proximity sensor 342.

Figure 7:
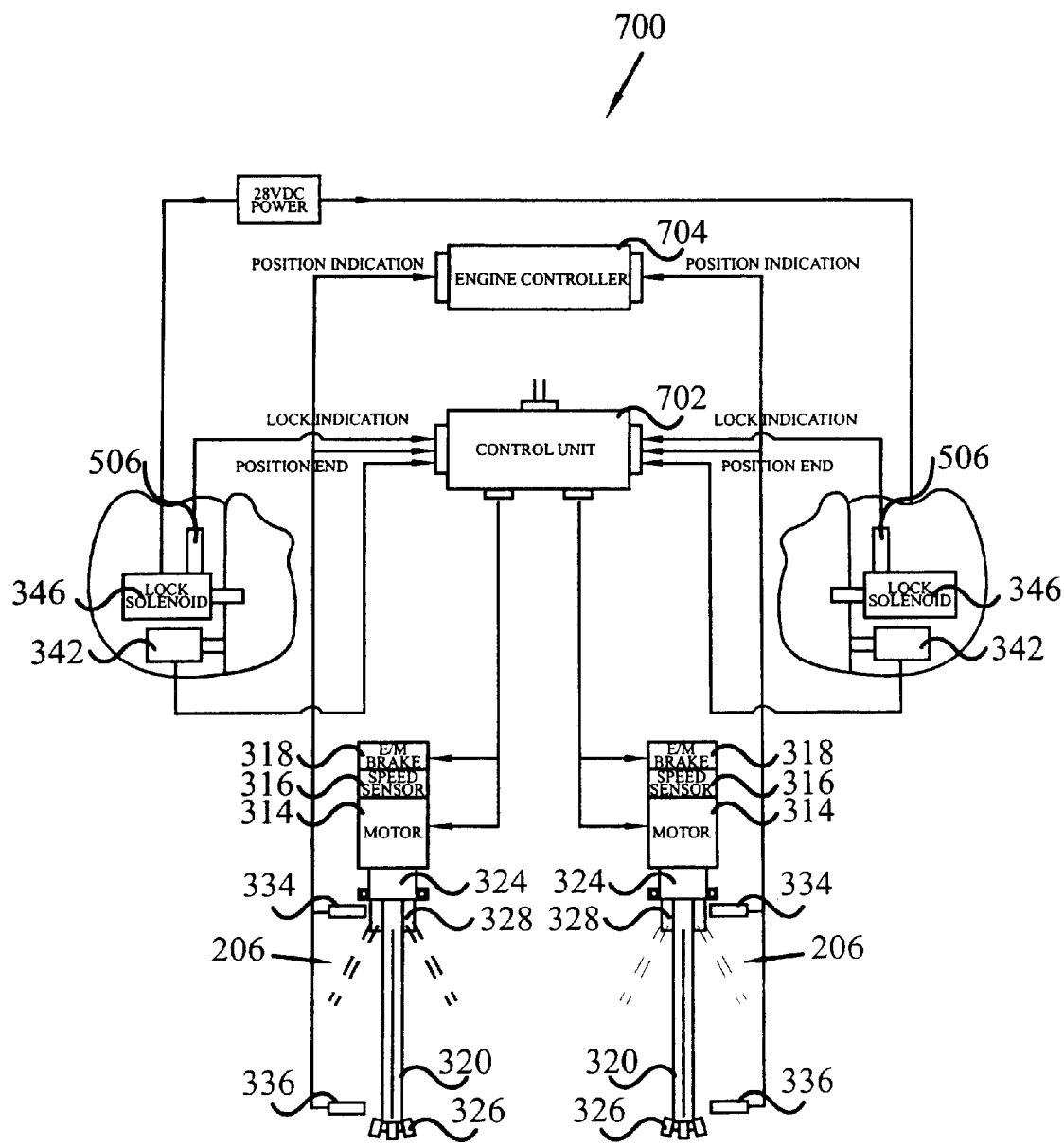
FIG. 7 is a simplified functional schematic representation of an exemplary thrust reverser control system according to an embodiment of the present invention.

The gearless electric actuators 206 are operated under the control of a thrust reverser control system. A simplified functional schematic representation of an exemplary thrust reverser control system is depicted in FIG. 7, and will now be described. The control system 700 preferably includes a multi-channel motor control unit 702, though it will be appreciated that multiple, single channel motor control units 702 could also be utilized. In any case, the motor control unit 702 is coupled to a multi-channel engine controller 704, and to at least two actuators 206. The motor control unit 702 receives commands from the engine controller 704 and, in response, supplies control signals to each of the actuators 206. These control signals include signals to energize the motor 314 and the electromagnetic brake assembly 316, thus causing the electromagnetic brake assembly 316 to remove its braking force on the motor 314 and causing the motor 314 to rotate in one of two directions, the deploy direction and the stow direction. The first 334 and second 336 proximity sensors supply signals representative of thrust reverser position to both the motor control unit 702 and the engine controller 704. Although the control system 700 described herein is directed to an embodiment in which the actuation control signals are supplied via the engine controller 704, the skilled artisan will appreciate that the actuation control signals could also come directly from airplane control.

As was noted above, the thrust reverser locks 344 are held in the locked position by the lock solenoid moveable slug 504, and are normally biased toward the unlocked position by the biasing element 502. The engine controller 704 also supplies control signals to selectively energize the lock solenoids 346 when the locks 344 are to be moved to the unlocked position. In response, the moveable slugs 504 translate from their extended positions to their retracted positions, allowing the biasing elements 502 to move the locks 344 to the unlocked position. The lock proximity sensors 506 each supply a signal to the motor control unit 702 indicating when the locks 344 are in the locked and unlocked positions. Similarly, the thrust reverser door proximity sensors 342 each supply a signal to the motor control unit 702 indicating when the thrust reverser doors 204 have reached the stowed position.

Having described the actuators 206 and control system 700 from a structural standpoint, a description of the operation of the actuators 206 and control system 700 will now be provided. In doing so, reference should be made to FIGS. 3–7 in combination. Additionally, this operational description is predicated on the thrust reverser initially being in the stowed position, moved to the deployed position, and then back to the stowed position again.

To deploy the thrust reverser doors 204 from the stowed position to the deployed position, the pilot inputs a deploy command to the engine controller 704. The engine controller 704, in turn, supplies command signals to the motor controller 702, and also causes the lock solenoids 346 to be energized. Upon receipt of the command from the engine controller 704, the motor controller 702 energizes the motors 314 and electromagnetic brake assemblies 316, releasing the braking force on the motors 314. In one embodiment, the engine controller 704 initially causes the motors 314 to rotate in the stow direction. This initial rotation of the motors 314 and the jack screws 320, and thus the translation of the roller nuts 328, in the stow direction causes the thrust reverser doors 204 to move in the stow direction, toward what is referred to as an "overstow" movement against the locks 344. This overstow movement of the doors 204 against the locks 344 rotates the locks 344 out of contact with the lock solenoid moveable slug 504.

When the engine controller 704 causes the lock solenoids 346 to be energized, the moveable slugs 504 are move to their retracted positions. As a result, the biasing elements 502 move their respective locks 344 to the unlocked position, releasing the thrust reverser doors 204. The rotation of the locks 344 to the unlocked position his sensed by the lock proximity sensors 506, which supply appropriate signals to the engine controller 704 and motor control unit 702.

Thereafter, when the motor control unit 702 receives the signal from the lock proximity sensors 506 indicating that the thrust reverser doors 204 are no longer locked, it issues signals that energize the motors 314 to rotate in the deploy direction. As a result, the jack screws 320 rotate, causing the associated roller nut assemblies 328 to translate toward the deployed position, which move the thrust reverser doors 204 to the deployed position.

As the roller nut assemblies 328 translate from the stowed position to the deployed position, the first 334 and second 336 proximity sensors associated with each actuator 206 supply appropriate position signals to both the engine controller 704 and the motor control unit 702. In addition, the thrust reverser door proximity sensors 342 each supply a signal to the motor control unit 702 indicating that the thrust reverser doors 204 are no longer in the stowed position. When the first 334 proximity sensors on each actuator 206 indicate that the roller nut assemblies 328, and thus the thrust reverser doors 204, are near the fully deployed position, the motor control unit 702 initiates the stopping sequence. This stopping sequence includes shorting the motors 314, which provides electromagnetic braking, and de-energizing the electromagnetic brake assemblies 316, which causes them to apply braking forces to the motors 314, both of which assist in stopping the motors 314 from rotating.

When the thrust reverser doors 204 no longer need to be deployed, the pilot inputs an appropriate command to the engine controller 704. The engine controller 704, in turn, supplies command signals to the motor controller 702, which energizes the motors 314 and electromagnetic brake assemblies 316, releasing the braking force from the motors 314 and causing the motors 314 to rotate in the stow direction. As a result, the jack screws 320 rotate, causing the associated roller nut assemblies 328 to translate toward the stowed position, which move the thrust reverser doors 204 to the stowed position.

As the roller nut assemblies 328 translate from the deployed position to the stowed position, the first 334 and second 336 proximity sensors associated with each actuator 206 supply appropriate position signals to both the engine controller 704 and the motor control unit 702. As the thrust reverser doors 204 approach the stowed position, the thrust reverser door proximity sensors 342 each supply a signal to the motor control unit 702 indicating that the thrust reverser doors 204 are in the stowed position. In addition, the thrust reverser doors 204 come into contact with the locks 344, causing the locks to rotate into the locked position. When the lock proximity sensors 506 in each actuator 206 indicate that the locks 344 are in the locked position, the engine controller 704 causes the lock solenoids 346 to be de-energized, and the motor control unit 702 de-energizes the motors 314 and electromagnetic brake assemblies 316. Thus, the moveable slugs 504 translate to their extended positions, holding the locks 344 in the locked position, and the electromagnetic brake assemblies 316 apply braking forces to the motors 314, stopping the motors 314 from rotating.

It is noted that in a preferred embodiment, in which the motor controller 702 implements a speed sensor feedback control scheme, the speed sensors 318 in each actuator 206 also supply motor speed feedback signals to the motor controller 702. Alternatively, if the motor controller 702 implements a sensorless speed control scheme, then the feedback signals from the speed sensors 318 are not used.

Because the jack screw has a relatively fine thread pitch, the electric actuator and actuation system described immediately above does not require intervening gears between the motor and the jack screw making it relatively lightweight and compact. The actuator may also include all of the actuation and sensing components in a single actuation package. The actuator is especially useful in relatively small jet aircraft applications, but may be utilized in aircraft of various sizes, both large and small.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A system for controlling the movement of a jet engine thrust reverser assembly, comprising:
   a controller coupled to receive command signals and operable, in response thereto, to selectively supply actuator control signals; and
   at least two actuators each operable to move the thrust reverser between a stowed position and a deployed position, each actuator having:
      an electric motor having an output shaft, the electric motor electrically coupled to receive the actuator control signals from the controller and, in response thereto, to rotate the output shaft in one of a stow direction and a deploy direction,
      one rotationally mounted jack screw having a first end and a second end, the first end coupled to the electric motor output shaft without any intervening gears to thereby rotate in the stow direction and deploy direction,
      a roller nut assembly mounted on the jack screw, the roller nut further having a connector configured to couple to the thrust reverser assembly, and
      at least one roller nut position sensor operable to supply position signals representative of a position of the roller nut whereby thrust reverser position is determined,
      wherein rotation of the jack screw in the stow direction causes translation of its associated roller nut assembly toward the jack screw second end and the thrust reverser toward the stowed position, and rotation of the jack screw in the deploy direction causes translation of its associated roller nut toward the jack screw first end and the thrust reverser toward the deployed position.

2. The system of claim 1, wherein the controller is further operable to selectively supply brake signals, and wherein each actuator further comprises:
   an electromagnetic brake assembly coupled to the electric motor and electrically coupled to receive the brake signals and operable, in response thereto, to selectively stop the electric motor.

3. The system of claim 1, wherein the at least one roller nut position sensor comprises a first position sensor and a second position sensor, the first position sensor coupled to the actuator proximate the jack screw first end and the second position sensor coupled to the actuator proximate the jack screw second end.

4. The system of claim 1, wherein the jack screw is a roller screw having a thread pitch of approximately 0.078 inches.

5. The system of claim 1, wherein each of the actuators further comprises:
   a stow position switch operable to supply a thrust reverser stow signal when the thrust reverser is in the stowed position.

6. The system of claim 1, wherein each of the actuators further comprises:
   at least one thrust reverser lock operable to selectively move between a locked position and an unlocked position.

7. The system of claim 6, wherein each lock is pivotally mounted proximate an end of the actuator, and wherein the actuator further comprises:
   a biasing element mounted proximate one of the at least one locks and having a portion in abutting contact with the lock, to thereby bias the lock toward the unlocked position.

8. The system of claim 7, wherein the controller is further operable to supply lock control signals, and wherein each actuator further comprises:
   a lock solenoid having a moveable slug, the lock solenoid coupled to receive the lock control signals and operable, in response thereto, to selectively move the slug so as to engage and disengage the lock.

9. The system of claim 7, wherein each of the actuators further comprises:
  a lock position indicator coupled to the actuator proximate the at least one lock and operable to supply lock position signals representative of the locked and unlocked position.

10. The system of claim 1, wherein the jack screw is rotationally mounted by at least two bearing assemblies.

11. The system of claim 1, wherein each of the actuators further comprises:
  a speed sensor coupled to the electric motor and operable to generate a feedback signal representative of electric motor rotational speed,
  wherein the controller is coupled to receive the feedback signal from the speed sensor and condition the actuator control signals to control the electric motor rotational speed.

12. A thrust reverser actuator, comprising:
  an electric motor having an output shaft operable to rotate in one of a first direction and a second direction;
  one rotationally mounted jack screw having a first end and a second end, the first end coupled to the electric motor output shaft without any intervening gears, to thereby rotate in the first direction and the second direction;
  a roller nut assembly mounted on the jack screw and configured to couple to a thrust reverser; and
  at least one roller nut position sensor operable to supply position signals representative of a position of the roller nut,
  wherein rotation of the jack screw in the first direction causes translation of the roller nut assembly toward the jack screw first end and rotation of the jack screw in the second direction causes translation of the roller nut toward the jack screw second end.

13. The actuator of claim 12, further comprising:
  an electromagnetic brake assembly coupled to the electric motor and operable, in response to a predetermined signal, to selectively stop the rotation of the electric motor.

14. The actuator of claim 12, wherein the roller nut position sensor comprises a first position sensor and a second position sensor, the first position sensor coupled to the actuator proximate the jack screw first end and the second position sensor coupled to the actuator proximate the jack screw second end.

15. The actuator of claim 14, wherein each position sensor comprises an eddy current kill oscillator (ECKO) proximity sensor.

16. The actuator of claim 15, further comprising:
  a first target assembly coupled to a first portion of the roller nut, the first target assembly positioned adjacent the first position sensor when the roller nut is positioned proximate the jack screw first end; and
  a second target assembly coupled to a second portion of the roller nut, the second target assembly positioned adjacent the second position sensor when the roller nut is positioned proximate the jack screw second end.

17. The actuator of claim 12, further comprising:
  a stow position switch operable to supply a thrust reverser stow signal when a thrust reverser is in the stowed position.

18. The actuator of claim 12, further comprising:
  at least one thrust reverser lock operable to selectively move between a locked position and an unlocked position.

19. The actuator of claim 18, further comprising:
  a solenoid operable, in response to an input signal, to selectively engage and disengage the thrust reverser lock.

20. The actuator of claim 18, further comprising:
  a lock position indicator positioned proximate the thrust reverser lock and operable to supply lock position signals representative of the locked and unlocked position.

21. The actuator of claim 12, wherein the jack screw is rotationally mounted by at least two bearing assemblies.

22. The actuator of claim 12, further comprising:
  a speed sensor coupled to the electric motor and operable to generate a feedback signal representative of electric motor rotational speed.

23. The actuator of claim 12, wherein the jack screw is a roller screw having a thread pitch of approximately 0.078 inches.

24. A thrust reverser actuator, comprising:
  a housing;
  an electric motor mounted within the housing, the motor having an output shaft operable to rotate in one of a first direction and a second direction;
  an electromagnetic brake assembly mounted within the housing and coupled to the electric motor and operable to selectively stop the rotation of the electric motor;
  one rotationally mounted roller screw mounted within the housing, the roller screw having a first end and a second end, the first end coupled to the electric motor output shaft without any intervening gears, to thereby rotate in the first direction and the second direction; and
  a roller nut assembly mounted on the jack screw and configured to couple to a thrust reverser; and
  at least one roller nut position sensor operable to supply position signals representative of a position of the roller nut,
  wherein rotation of the jack screw in the first direction causes translation of the roller nut assembly toward the jack screw first end and rotation of the jack screw in the second direction causes translation of the roller nut toward the jack screw second end.

25. The actuator of claim 24, wherein the at least one roller nut position sensor comprises a first position sensor and a second position sensor, the first position sensor coupled to the actuator proximate the jack screw first end and the second position sensor coupled to the actuator proximate the jack screw second end.

26. The actuator of claim 25, wherein each position sensor comprises an eddy current kill oscillator (ECKO) proximity sensor.

27. The actuator of claim 26, further comprising:
  a first target assembly coupled to a first portion of the roller nut within the housing, the first target assembly positioned adjacent the first position sensor when the roller nut is positioned proximate the jack screw first end; and
  a second target assembly coupled to a second portion of the roller nut within the housing, the second target assembly positioned adjacent the second position sensor when the roller nut is positioned proximate the jack screw second end.

28. The actuator of claim 24, further comprising:
  a stow position switch mounted within the housing and operable to supply a thrust reverser stow signal when a thrust reverser is in the stowed position.

29. The actuator of claim 24, further comprising:

at least one thrust reverser lock mounted on the housing and operable to selectively move between a locked position and an unlocked position.

30. The actuator of claim 29, wherein each lock is pivotally mounted within the housing proximate an end of the actuator, and wherein the actuator further comprises:

a biasing element mounted within the housing proximate one of the locks and having a portion in abutting contact with the lock, to thereby bias the lock toward the unlocked position.

31. The actuator of claim 29, further comprising:

a solenoid mounted within the housing and having a moveable slug, the solenoid operable, in response to an input signal, to selectively move the slug so as to engage and disengage the lock.

32. The actuator of claim 29, further comprising:

a lock position indicator positioned proximate the lock and operable to supply lock position signals representative of the locked and unlocked position.

33. The actuator of claim 24, wherein the jack screw is rotationally mounted by at least two bearing assemblies.

34. The actuator of claim 24, further comprising:

a speed sensor coupled to the electric motor and operable to generate a feedback signal representative of electric motor rotational speed.

35. A thrust reverser actuator, comprising:

a housing;

an electric motor mounted within the housing and having an output shaft operable to rotate in one of a first direction and a second direction;

an electromagnetic brake assembly mounted within the housing and coupled to the electric motor and operable to selectively stop the rotation of the electric motor;

one jack screw rotationally mounted within the housing and having a first end and a second end, the first end coupled to the electric motor output shaft without any intervening gears, to thereby rotate in the first direction and the second direction;

a roller nut assembly mounted on the jack screw;

a first position sensor mounted within the housing and positioned proximate the jack screw first end;

a second position sensor mounted within the housing and positioned proximate the jack screw second end;

a first target assembly coupled to a first portion of the roller nut, the first target assembly positioned adjacent the first position sensor when the roller nut is positioned proximate the jack screw first end;

a second target assembly coupled to a second portion of the roller nut, the second target assembly positioned adjacent the second position sensor when the roller nut is positioned proximate the jack screw second end;

two thrust reverser locks pivotally mounted within the housing proximate an end thereof;

a biasing element mounted within the housing proximate one of the locks and having a portion in abutting contact with the lock, to thereby bias the lock toward the unlocked position;

a lock solenoid mounted within the housing and having a moveable slug, the lock solenoid operable, in response to an input signal, to selectively move the slug so as to engage and disengage the lock; and a lock position indicator mounted within the housing and positioned proximate the at least one lock and operable to supply lock position signals representative of the locked and unlocked position, wherein rotation of the jack screw in the first direction causes translation of the roller nut assembly toward the jack screw first end and rotation of the jack screw in the second direction causes translation of the roller nut toward the jack screw second end.

\* \* \* \* \*